United States Patent [19]

Chiang et al.

[11] 4,421,729
[45] Dec. 20, 1983

[54] PREPARATION OF STRONTIUM CARBONATE

[75] Inventors: John S. Chiang, Mercerville; David Goldstein, East Brunswick, both of N.J.

[73] Assignee: FMC Corporation, Philadelphia, Pa.

[21] Appl. No.: 338,829

[22] Filed: Jan. 11, 1982

[51] Int. Cl.$^3$ .......................... C01F 11/40; C01F 5/24
[52] U.S. Cl. ................................... 423/430; 423/162; 423/165; 423/395; 423/397
[58] Field of Search ............... 423/162, 165, 395, 430, 423/397

[56] References Cited

U.S. PATENT DOCUMENTS

| | | | |
|---|---|---|---|
| 1,532,533 | 4/1925 | Harris | 427/077 |
| 2,703,790 | 3/1955 | Anderson | 252/455 R |
| 3,333,919 | 8/1967 | Buckingham | 423/165 |
| 3,743,691 | 7/1973 | Trew | 423/165 |
| 4,115,219 | 9/1978 | Gancy et al. | 204/099 |
| 4,337,233 | 6/1982 | Chiang et al. | 423/395 |

FOREIGN PATENT DOCUMENTS

| | | | |
|---|---|---|---|
| 53-16397 | 2/1978 | Japan | 423/430 |
| 1912 | of 1912 | United Kingdom | 423/165 |
| 522135 | 10/1976 | U.S.S.R. | 423/430 |
| 497823 | 9/1977 | U.S.S.R. | 423/165 |
| 645938 | 2/1979 | U.S.S.R. | 423/430 |

Primary Examiner—Gary P. Straub
Attorney, Agent, or Firm—Christopher Egolf

[57] ABSTRACT

Strontium carbonate is prepared by the process of reacting strontium nitrate in an aqueous reaction medium with carbon dioxide to precipitate strontium carbonate product, the nitric acid byproduct that forms being neutralized by the introduction of lime to the reaction medium.

14 Claims, 2 Drawing Figures

PREPARATION OF STRONTIUM CARBONATE

BACKGROUND OF THE INVENTION

The present invention relates to the preparation of strontium carbonate by the reaction of strontium nitrate with carbon dioxide.

Strontium carbonate is used in the manufacture of television picture tube face-plate glass, as an x-ray screening agent, and in ferrite magnets.

Most strontium carbonate is derived from natural ores, usually celestite (predominantly strontium sulfate).

The "black ash" process is the commercial process currently employed for producing strontium carbonate from celestite ore. Ground celestite is mixed with finely divided carbon and the mixture calcined at a temperature of about 1000° C. to yield a black ash containing strontium sulfide (SrS) from the strontium sulfate in the ore and gaseous by products carbon dioxide ($CO_2$) and carbon monoxide (CO). The water-soluble strontium sulfide is leached from the black ash with hot water, and the aqueous solution then separated from the undissolved ore impurities by settling and filtration. The dissolved strontium sulfide is converted to strontium carbonate by carbonating the aqueous solution with $CO_2$ or, more commonly, by reacting the aqueous solution with sodium carbonate.

The strontium carbonate precipitates from solution and is recovered by conventional solids-liquid separation procedures and dried.

Disadvantages of the black ash process include the requirement of high process temperatures and disposal of the reaction byproducts, sodium sulfide (when sodium carbonate is the carbonate source) or hydrogen sulfide (when $CO_2$ is the carbonate source).

The strontium carbonate produced by the black ash process may also be converted to other strontium salt products, e.g., strontium nitrate. Strontium nitrate is typically prepared by dissolving strontium carbonate with a strong aqueous nitric acid solution, thus forming strontium nitrate and carbon dioxide. Impurities in the resultant aqueous solution are precipitated with lime and removed, before strontium nitrate is recovered from the filtered solution by evaporative crystallization.

The process of this invention provides an alternative to the production of strontium carbonate via the conventional black ash process, by employing strontium nitrate as a strontium source. Such strontium nitrate may be prepared from celestite ore by the process described in our co-pending U.S. application Ser. No. 273,282, filed June 12, 1981, now U.S. Pat. No. 4,337,233, which process may advantageously be integrated with the present invention.

SUMMARY OF THE INVENTION

In accordance with the present invention, strontium carbonate is prepared by the process of reacting strontium nitrate in an aqueous reaction medium with carbon dioxide to precipitate strontium carbonate product, neutralizing nitric acid byproduct which forms during the reaction by introducing lime into the aqueous reaction medium, and recovering the solid strontium carbonate product.

The molar ratio of calcium to strontium in the aqueous phase of the reaction medium should be maintained at from 0.1:1 to about 7:1 Ca:Sr.

The temperature during the carbonation reaction and neutralization should be maintained at above the reaction medium freezing point up to 50° C., and preferably at from 10° to 30° C.

The addition of carbon dioxide and the introduction of the lime are preferably preformed as separate operations. The pH of the reaction medium during carbonation is preferably maintained at a value less than 6 and during the lime addition is preferably maintained at greater than 6 but less than 10.

The concentration of strontium nitrate dissolved in the aqueous reaction medium is not critical but for economic considerations is preferably maintained at at least 80% of saturation, particularly in continuous embodiments of the invention.

DETAILED DESCRIPTION

Figure 1:
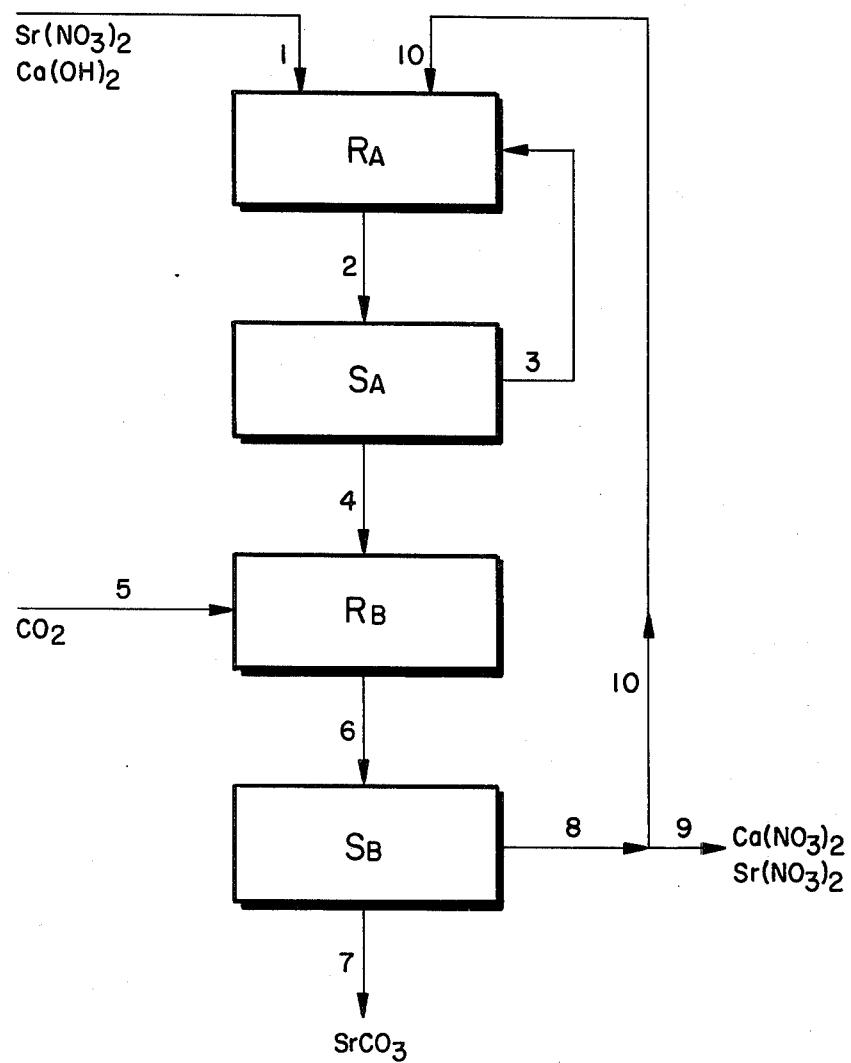
FIG. 1 depicts a flow sheet showing the continous preparation of strontium carbonate in a preferred embodiment of the invention in which the carbonation and lime slurry addition operations are carried out separately.

The chemical reactions by which strontium carbonate is prepared from strontium nitrate are as follows:

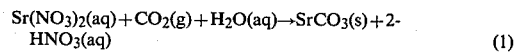

$$Sr(NO_3)_2(aq) + CO_2(g) + H_2O(aq) \rightarrow SrCO_3(s) + 2HNO_3(aq) \quad (1)$$

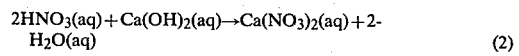

$$2HNO_3(aq) + Ca(OH)_2(aq) \rightarrow Ca(NO_3)_2(aq) + 2H_2O(aq) \quad (2)$$

The first reaction produces strontium carbonate as a precipitate by carbonation of an aqueous solution containing strontium nitrate.

The second reaction is the neutralization of aqueous nitric acid, formed as a byproduct in the first reaction, with lime to form calcium nitrate byproduct. This second reaction serves to remove byproduct nitric acid from the first reaction, thereby driving the first reaction to completion. The nitric acid ordinarily is reacted with lime dissolved in the aqueous reaction medium, but it is possible that neutralization may also occur, when a lime slurry is employed, between the aqueous nitric acid and lime solids in the slurry.

The overall reaction thus requires carbon dioxide and lime, as raw materials, in addition to the strontium nitrate, and yields byproduct calcium nitrate.

The process of the present invention is carried out by maintaining control over the concentrations and solubilities of the individual reactants and (by)products. The strontium nitrate concentration in the aqueous phase of the reaction medium is preferably maintained at a value of at least 80% of saturation, particularly when the process of the invention is operated on a continuous basis. The molar ratio of calcium to strontium dissolved in the aqueous phase should be maintained at from 0.1:1 to about 7:1 Ca:Sr. The molar ratio is preferably maintained at from 1:1 to about 5:1 Ca:Sr.

It has been discovered that when the Ca:Sr molar ratio is maintained within these limits, carbon dioxide introduced during the carbonation step reacts selectively and preferentially with strontium, forming strontium carbonate which precipitates. Calcium carbonate does not form under these conditions, so long as the amount of carbon dioxide added is not excessive.

The process of this invention is preferably operated continuously. In such continuous operation, the desired range for the calcium-strontium molar ratio may be maintained by controlling the respective feed rates of calcium (as lime) and strontium (as strontium nitrate). For example, a molar ratio of 5:1 Ca:Sr can be maintained, dissolved in the aqueous reaction medium, by introducing to the reaction medium five moles of lime for every six moles of strontium nitrate. In the carbonation step shown as reaction (1), five of the six moles of strontium nitrate are converted to five moles of strontium carbonate, which precipitates, leaving the remaining unreacted mole of strontium nitrate in solution. In the neutralization step shown as reaction (2), five moles of lime are utilized to neutralize the ten moles of nitric acid formed in reaction (1), which results in the formation of five moles of soluble calcium nitrate. Consequently, the calcium to strontium molar ratio in the aqueous phase is maintained at 5:1 Ca:Sr. Other molar ratios can be obtained by adjusting the strontium and calcium feed rates in an analogous fashion.

The lime and strontium nitrate feeds in the preferred continuous operation can be introduced separately or, more preferably, as a combined stream. The latter, preferred mode of operation permits better control of the calcium:strontium molar ratio. Another advantage of the combined lime and strontium nitrate feedstream is that less water is required to provide for dissolution of these components than would be required for separate streams.

The two reactions, involving precipitation of strontium carbonate product and neutralization of nitric acid byproduct, are carried out at relatively low temperature. The reaction medium temperature should be not higher than 50° C. and may be as low as just above the solution freezing point. Reaction temperatures of from 10° to 30° C. are preferred. Such preferred lower temperatures promote the amount of lime that may be dissolved in the aqueous reaction medium and which is thus available for neutralizing byproduct nitric acid.

Atmospheric pressure or higher pressures may be employed for the carbonation and neutralization reactions.

The controlled calcium:strontium molar ratio in the aqueous phase and low reaction temperatures favor the precipitation of the strontium carbonate reaction product, over that of unwanted byproduct calcium carbonate. At the preferred low temperatures, strontium carbonate is much less soluble than calcium carbonate and therefore readily precipitates. Conversely, calcium carbonate solubility is enhanced at lower temperatures, thus minimizing the likelihood of calcium carbonate co-precipitating with strontium carbonate.

The addition of the carbon dioxide gas and of the lime is preferably carried out in a manner which minimizes the possibility of formation of undesirable calcium carbonate byproduct from over-carbonation and/or from a gas-solid reaction.

The pH of the aqueous reaction medium during the addition of carbon dioxide to precipitate strontium nitrate is preferably maintained at a value not exceeding 6. More preferably, the pH is maintained at a value of from 4.5 to 6. This pH control may be achieved by controlling the addition rate of carbon dioxide into the reaction medium, thereby providing good control of the carbonate ($CO_3^=$) concentration in the aqueous phase.

The pH of the solution during the lime addition is preferably maintained at a value greater than about 6 but not exceeding 10. Higher pH values, greater than about 10, increase the likelihood of curd formation and are therefore best avoided. This pH control is preferably accomplished by adjusting the rate of introduction of the lime.

In order to achieve these preferred pH control ranges, the introduction of carbon dioxide into the reaction medium should be separate from the addition of the lime. This may be accomplished as a single operation in a single stage reactor by alternately introducing the two components, or by introducing one of the components in a side stream treatment.

A preferred procedure is one which utilizes multiple reactor stages, the addition of carbon dioxide to precipitate strontium carbonate product being carried out in a different reactor stage from that utilized for the lime addition.

The lime may be added in the form of CaO or Ca(OH)$_2$. The use of a lime slurry, preferably one containing from 5-30 wt % CaO, is preferred. This ensures that a substantially saturated concentration of dissolved lime will be available for neutralizing the nitric acid byproduct. It is preferred that at least a stoichiometric amount of lime be available for neutralizing the nitric acid.

As mentioned previously, the lime may be combined with the strontium nitrate feedstream so that the two are introduced together, thus providing good control of the calcium:strontium mole ratio.

The two reactions in this invention, carbonation of strontium nitrate and the neutralization of nitric acid byproduct, are both relatively fast reactions. Reaction times for the respective reactions are therefore not critical. A reasonable residence time, of from a few minutes, 0.25 hour or less, to over several hours, preferably not more than five hours, is nevertheless desirable to allow for the formation and growth of large product crystals. The shorter residence times, up to an hour, are preferred.

Upon completion of the desired reaction/residence time, the crystallized strontium carbonate is recovered by conventional solids-liquid operation procedures, e.g., filtration or centrifugation.

The recovered product crystals are preferably washed to remove soluble strontium and calcium nitrates before being dried. With such washing, the purity of the strontium carbonate is relatively high, well in excess of 90% by weight SrCO$_3$.

Yields of strontium carbonate are at least 80%, based on strontium nitrate reactant, in the process of this invention. Under preferred operating conditions, strontium carbonate yields in excess of 90% are readily obtained.

A preferred embodiment of the process of the invention is exemplified schematically in FIG. 1. The process is operated in a continuous fashion, utilizing two separate reactor stages for introducing the carbon dioxide and lime slurry.

The two-stage reactor system provides improved overall reaction efficiencies, by separating the CO$_2$ gas addition from the lime slurry pH adjustment step, thereby minimizing the possibility of CO$_2$ reacting with calcium oxide, particularly in solid form, in an undesirable side reaction to form solid CaCO$_3$ byproduct.

The entire system is charged initially with an aqueous solution containing calcium nitrate and strontium nitrate solution in a 5:1 Ca:Sr molar ratio. The solution desirably contains 2.25 g-moles/l Ca(NO$_3$)$_2$ and 0.45 g-moles/l $Sr(NO_3)_2$. The solution in the system is maintained at a temperature of 25° C. during its operation.

The strontium nitrate feed 1 introduced to the first reactor stage $R_A$ is an aqueous slurry containing 37 wt % $Sr(NO_3)_2$ and 8 wt % CaO. The strontium nitrate is soluble, being contained in the aqueous phase of the slurry at a concentration of about 2.7 g-mole/liter (almost a saturation concentration at 25° C.). The lime in the slurry is hydrolyzed to $Ca(OH)_2$, which is partially soluble in the solution. The molar ratio of $Ca(OH_2):Sr(NO_3)_2$ is approximately 5:6, this molar ratio includes both dissolved and undissolved lime present in the slurry.

The strontium nitrate slurry feed is introduced continuously into the first reactor stage $R_A$ via stream 1. The dissolution of $Ca(OH)_2$ in reactor $R_A$ is promoted by maintaining the reactor pH below 10. This may be accomplished via controlling the relative flow rates of recycle stream 10 (solution containing unreacted strontium nitrate, neutralization byproduct calcium nitrate and residual, unreacted nitric acid, from the second stage separator $S_B$) and of the slurry feed stream 1.

The reaction mixture from reactor stage $R_A$ is separated, in solids-liquid separator $S_A$, into two streams. Undissolved $Ca(OH)_2$ is recycled back to reactor stage $R_A$ as stream 3.

The aqueous solution 4 from separator $S_A$, containing dissolved strontium nitrate and calcium hydroxide, is introduced to the second reactor stage $R_B$. Carbon dioxide gas is also introduced into reactor stage $R_B$, via stream 5.

In second reactor stage $R_B$, carbon dioxide reacts with strontium nitrate, thereby precipitating strontium carbonate product and forming byproduct $HNO_3$.

Most of the nitric acid formed in reactor stage $R_B$ reacts with dissolved $Ca(OH)_2$ to produce calcium nitrate. It is preferred that at least a stoichiometric amount of lime be provided for neutralization of the nitric acid byproduct. Precipitation of $CaCO_3$ an an unwanted side reaction product in reactor stage $R_B$ is minimized by controlling the reactor solution pH at a value not to exceed 6. This is preferably accomplished by regulating the relative flow rates of solution feed in stream 4 and $CO_2$ gas in stream 5.

The reaction mixture from reactor stage $R_B$ is removed as stream 6 and passed to solids-liquid separator $S_B$, where the reaction mixture is separated into two streams, product and recycle solution. The solid product, strontium carbonate, is removed via stream 7 and may be water-washed before being dried. The unreacted strontium nitrate and byproduct calcium nitrate (from the $HNO_3$—$Ca(OH)_2$ reaction) are contained in solution that is shown as stream 8.

A portion of stream 8 is recycled to the first reactor stage $R_A$, via stream 10, the balance being sent via stream 9, to a hold tank (not shown) for disposal or further treatment A part of stream 9 may also be diverted for use as feed to the second reactor stage $R_B$.

The preferred embodiment described above may also be integrated with a process for preparing strontium nitrate from celestite, which is fully described in our copending application Ser. No. 273,282, filed June 12, 1981, now U.S. Pat. No. 4,337,233, which is hereby incorporated by reference.

Figure 2:
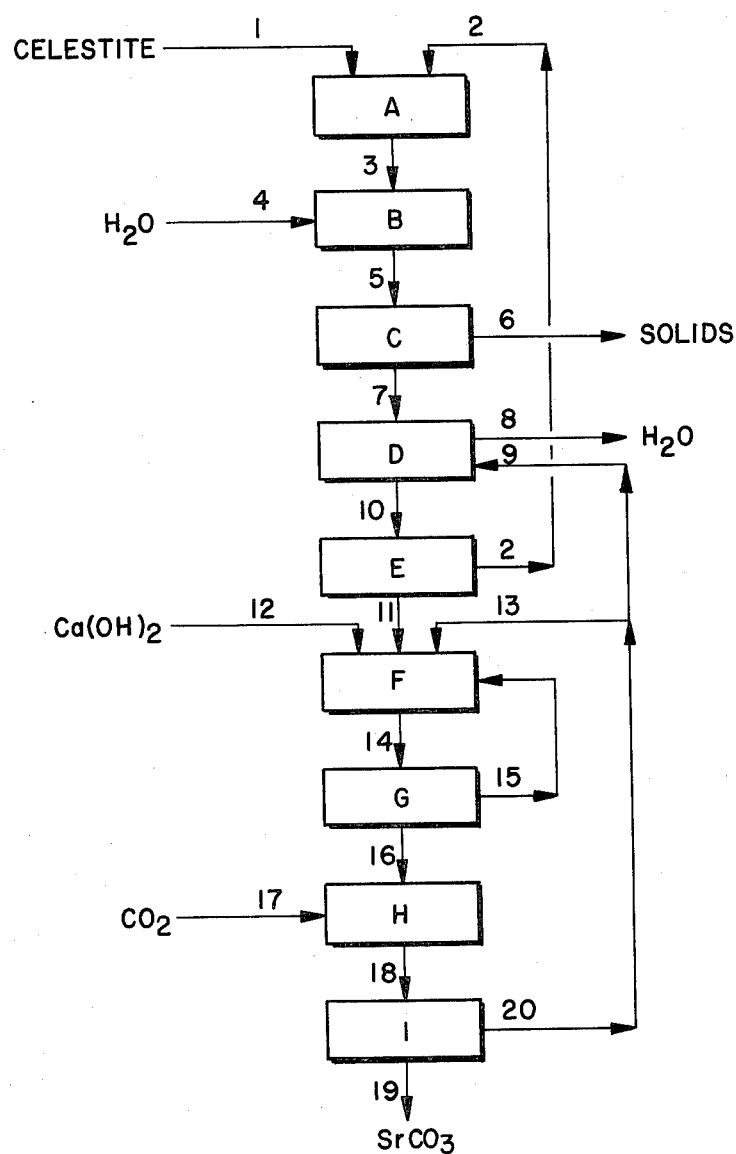
FIG. 2 depicts a flow sheet showing the continuous preparation of strontium carbonate from celestite ore, by a method which incorporates the present invention.

The overall process produces strontium carbonate from celestite ore (crude strontium sulfate) and is exemplified schematically in FIG. 2. The process requires carbon dioxide and lime, in addition to the celestite, as raw materials. Only calcium sulfate is produced as a byproduct; calcium nitrate that is generated is utilized in the conversion of celestite to strontium nitrate.

Ground celestite ore 1 is reacted in FIG. 2 with an aqueous calcium nitrate solution 2 in reactor A to form a reaction mixture 3 containing strontium nitrate and calcium sulfate.

Reaction mixture 3 is extracted with water 4 in an extractor B forming an aqueous slurry 5 containing strontium nitrate and unreacted calcium nitrate, both dissolved in solution.

The aqueous slurry 5 is then processed in a filter C to separate the solids 6, byproduct calcium sulfate and ore residue, from the solution 7 containing strontium and calcium nitrates. The solids 6 are discarded. The aqueous solution 7 is concentrated in an evaporator D, sufficient water 8 being removed to precipitate all of the strontium nitrate but leave the calcium nitrate dissolved in solution. Along with aqueous solution 7, recycled aqueous solution 9 containing calcium nitrate and strontium nitrate (described further below) is also introduced into the evaporator D.

The concentrated slurry 10 is treated in a separator E to recover an aqueous calcium nitrate solution 2, which is recycled to reactor A to react with celestite, and crystalline strontium nitrate 11.

The strontium nitrate solids 11 are redissolved in dissolver F with an aqueous lime slurry 12. Recycled aqueous solution 13 containing calcium nitrate and strontium nitrate (described further below) is also introduced into the dissolver F. The aqueous slurry in dissolver F is maintained at a pH of greater than 6 but not exceeding 10.

The mixture 14 from dissolver F is passed to a separator G which separates the undissolved lime 15 from the aqueous solution 16 containing dissolved lime and strontium nitrate. The undissolved lime 15 is recycled to the dissolver F.

The aqueous strontium nitrate solution 16 is introduced into precipitator H. Carbon dioxide gas 17 is also added to precipitator H at a controlled rate. The source of the $CO_2$ gas is not critical; although waste gas streams containing $CO_2$ could be utilized for this purpose, a concentrated $CO_2$ gas stream is preferred. The pH in precipitator H is maintained at a value not exceeding 6; the temperature is maintained at about 25° C.

In the precipitator H, the carbonation of dissolved strontium nitrate precipitates strontium carbonate, and byproduct nitric acid that is formed is neutralized to calcium nitrate by the dissolved lime.

The reaction mixture 18, containing precipitated strontium carbonate, is passed into a separator I where strontium carbonate 19 is recovered as a solid product leaving behind aqueous solution 20 containing byproduct calcium nitrate and unreacted strontium nitrate.

The aqueous solution 20 from separator I is recycled, preferably in part as stream 13 back to the dissolver F to assist in dissolving lime, and in part as stream 9 back to the evaporator D to replenish calcium nitrate that was consumed in reaction with celestite in reactor A. The aqueous solution 20, however, may alternatively be recycled either completely to dissolver F or completely to evaporator D.

The strontium carbonate solids 19 are dried, after water-washing (not shown), to recover a substantially calcium-free strontium carbonate product.

We claim:

1. The process of preparing strontium carbonate which comprises
   (a) reacting strontium nitrate in an aqueous reaction medium, that is concentrated with respect to strontium nitrate, with carbon dioxide to selectively precipitate strontium carbonate product;
   (b) neutralizing nitric acid byproduct which forms during the reaction by introducing sufficient lime into the aqueous reaction medium to obtain a molar ratio of dissolved calcium to dissolved strontium therein at from 0.1:1 to about 7:1 Ca:Sr; and
   (c) recovering the solid strontium carbonate product substantially free of lime and calcium carbonate from the reaction medium.

2. The cyclic process of preparing strontium carbonate from celestite which comprises
   (a) mixing ground celestite ore with greater than a stoichiometric quantity of calcium nitrate in an aqueous mixture to react strontium sulfate in the celestite with calcium nitrate, the aqueous mixture containing insufficient water to solubilize all strontium values in the celestite as strontium nitrate;
   (b) contacting the aqueous mixture, quickly and with vigorous agitation, with additional water to rapidly dissolve and extract soluble strontium nitrate, the total amount of added water being at least equal to the amount required to solubilize essentially all of the strontium nitrate in the aqueous mixture;
   (c) separating the aqueous solution containing solubilized strontium nitrate and unreacted calcium nitrate from the undissolved mixture solids;
   (d) fractionally crystallizing strontium nitrate from the aqueous solution by evaporation of water from the solution;
   (e) separating the crystallized strontium nitrate, the aqueous calcium nitrate solution that remains being recycled to step (a) for reaction with celestite ore;
   (f) redissolving the crystallized strontium nitrate in an aqueous reaction medium;
   (g) reacting strontium nitrate in an aqueous reaction medium, that is concentrated with respect to strontium nitrate, with carbon dioxide to selectively precipitate strontium carbonate product;
   (h) neutralizing nitric acid byproduct which forms during the reaction by introducing sufficient lime into the aqueous reaction medium to obtain a molar ratio of dissolved calcium to dissolved strontium therein at from 0.1:1 to about 7:1 Ca:Sr; and
   (i) recovering the solid strontium carbonate product substantially free of lime and calcium carbonate, the aqueous mother liquor containing calcium nitrate and unreacted strontium nitrate that remains being recycled to step (d) or step (g) or both.

3. The process of claim 2, wherein the redissolution of crystallized strontium nitrate in the aqueous reaction medium in step (f) is accomplished with an aqueous lime slurry, thereby providing the requisite lime for neutralization of nitric acid in step (h).

4. The process of claim 1 or 2 wherein the process is operated on a continuous basis.

5. The process of claim 1 or 2 wherein sufficient strontium nitrate is dissolved in the aqueous reaction medium to provide a concentration of at least 80% of its saturation concentration.

6. The process of claim 1 or 2 wherein the temperature during the carbonation reaction and neutralization is above the freezing point of the reaction medium up to 50° C.

7. The process of claim 1 or 2 wherein the residence time of strontium carbonate in the reaction medium is from 0.25 to 5 hours.

8. The process of claim 1 or 2 wherein at least a stoichiometric amount of lime is employed for neutralization of the nitric acid byproduct.

9. The process of claim 1 or 2 wherein the lime is introduced as a lime slurry, thereby providing for a substantially saturated concentration of dissolved lime for the neutralization.

10. The process of claim 9 wherein the carbonation and lime slurry addition are performed separately.

11. The process of claim 10 wherein the pH during the carbonation is maintained at from 4.5 to 6.

12. The process of claim 11 wherein the pH is controlled by adjusting the rate at which carbon dioxide is introduced into the reaction medium.

13. The process of claim 10 wherein the pH during the lime slurry addition is maintained at a value greater than 6 but not exceeding 10.

14. The process of claim 13 wherein the pH is controlled by adjusting the rate at which the lime slurry is introduced into the reaction medium.

* * * * *

UNITED STATES PATENT AND TRADEMARK OFFICE
CERTIFICATE OF CORRECTION

PATENT NO. : 4,421,729

DATED : December 20, 1983

INVENTOR(S) : John S. Chiang and David Goldstein

It is certified that error appears in the above—identified patent and that said Letters Patent is hereby corrected as shown below:

Column 5, line 39, "an an" should read --as an--.

Signed and Sealed this

Fifth Day of February 1985

[SEAL]

Attest:

DONALD J. QUIGG

*Attesting Officer*  *Acting Commissioner of Patents and Trademarks*

UNITED STATES PATENT AND TRADEMARK OFFICE
CERTIFICATE OF CORRECTION

PATENT NO. : 4,421,729
DATED : December 20, 1983
INVENTOR(S) : John S. Chiang, et al It is certified that error appears in the above-identified patent and that said Letters Patent is hereby corrected as shown below:

Column 7, line 40, should read -- (g) reacting the strontium nitrate in the aqueous reaction --.

Signed and Sealed this

Sixteenth Day of April 1985

[SEAL]

Attest:

DONALD J. QUIGG

Attesting Officer     Acting Commissioner of Patents and Trademarks